US008164588B2

(12) United States Patent
Lauxtermann et al.

(10) Patent No.: US 8,164,588 B2
(45) Date of Patent: Apr. 24, 2012

(54) SYSTEM AND METHOD FOR MEMS ARRAY ACTUATION INCLUDING A CHARGE INTEGRATION CIRCUIT TO MODULATE THE CHARGE ON A VARIABLE GAP CAPACITOR DURING AN ACTUATION CYCLE

(75) Inventors: Stefan Clemens Lauxtermann, Camarillo, CA (US); Hakan Durmus, Los Angeles, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 377 days.

(21) Appl. No.: 12/126,698

(22) Filed: May 23, 2008

(65) Prior Publication Data

US 2009/0289606 A1 Nov. 26, 2009

(51) Int. Cl.
*G06F 3/038* (2006.01)
*G09G 5/00* (2006.01)

(52) U.S. Cl. ...... 345/214; 359/290; 359/291; 359/224.1

(58) Field of Classification Search .................. 345/214; 359/290, 291, 224.1
See application file for complete search history.

(56) References Cited

U.S. PATENT DOCUMENTS 4,678,938 A * 7/1987 Nakamura .................... 327/515
5,811,808 A * 9/1998 Cannata et al. ............... 250/332
6,885,396 B1 * 4/2005 Panicacci et al. ............. 348/241
6,995,737 B2 * 2/2006 LeChevalier ................... 345/82
7,605,376 B2 * 10/2009 Liu ......................... 250/370.09
2002/0093446 A1 * 7/2002 Horsley et al. ................ 341/157
2003/0156101 A1 * 8/2003 LeChevalier ................. 345/204
2003/0201777 A1 * 10/2003 Gogoi et al. .................. 324/415
2004/0041931 A1 * 3/2004 Tu et al. ........................ 348/300
2004/0218251 A1 * 11/2004 Piehl et al. .................... 359/290
2004/0218334 A1 * 11/2004 Martin et al. ................. 361/139
2005/0072923 A1 * 4/2005 Elkind et al. .................. 250/332
2006/0237627 A1 * 10/2006 Gardner et al. ............ 250/208.1
2009/0108207 A1 * 4/2009 Liu ............................... 250/366
2009/0115735 A1 * 5/2009 Chuang ......................... 345/173

* cited by examiner

*Primary Examiner* — Patrick Assouad
*Assistant Examiner* — Manuel Hernandez
(74) *Attorney, Agent, or Firm* — Koppel, Patrick, Heybl & Philpott

(57) ABSTRACT

An actuator and method for MEMS array actuation is disclosed. In one embodiment, the actuator having a pixel coupled to a charge integration circuit, the pixel comprising a voltage bias, a variable gap capacitor, and a switch, all in series, the charge integration circuit configured to modulate charge on the variable gap capacitor during an actuation cycle. In one embodiment, the MEMS actuator having a unit cell with parasitic capacitance and coupled to a negative feedback sampling circuit, the unit cell comprising a variable gap capacitor, a voltage bias, a modulated current source, and a voltage-to-current converter, the negative feedback sampling circuit configured to receive an output current from the unit cell, convert the output current from the unit cell to a low voltage signal, sample the low voltage signal, and provide a feedback signal to the modulated current source to compensate for the parasitic capacitance in the unit cell.

6 Claims, 11 Drawing Sheets

SYSTEM AND METHOD FOR MEMS ARRAY ACTUATION INCLUDING A CHARGE INTEGRATION CIRCUIT TO MODULATE THE CHARGE ON A VARIABLE GAP CAPACITOR DURING AN ACTUATION CYCLE

BACKGROUND

This disclosure relates generally to Micro-Electro-Mechanical Systems (MEMS) and more specifically to MEMS array actuation.

SUMMARY

A MEMS actuator and method for MEMS array actuation is disclosed. In one embodiment, the MEMS actuator may include a pixel comprising a voltage bias, a variable gap capacitor, and a switch, all in series. The voltage bias providing a constant bias to the variable gap capacitor. The variable gap capacitor having a movable plate and a fixed plate separated by a variable gap responsive to a charge modulation applied to the variable gap capacitor. The switch is operable to begin an actuation cycle when closed and end the actuation cycle when opened, and a charge integration circuit coupled to the pixel and configured to modulate charge on the variable gap capacitor during the actuation cycle, wherein the actuation cycle initiates the flow of charge from the variable gap capacitor to the charge integration circuit. The pixel may include a diode to reset the variable gap capacitor. The MEMS actuator may include a pixel array with a plurality of said pixel coupled to the charge integration circuit.

The charge integration circuit may be coupled to the pixel via a single node. The charge integration circuit may include a fixed capacitor, an operational amplifier and a comparator. The capacitor for collecting charge flowing from the variable gap capacitor to the charge integration circuit during the actuation cycle. The operational amplifier is coupled to the capacitor and provides a corresponding voltage reading to the charge collected by the fixed capacitor. The comparator compares a predetermined voltage with the corresponding voltage reading from the operational amplifier and produces an output signal when the corresponding voltage reading equals the predetermined voltage, the output signal triggers the switch to open and end the actuation cycle.

In another embodiment, the MEMS actuator may include a unit cell with parasitic capacitance in parallel. The unit cell comprising a variable gap capacitor, a voltage bias, a modulated current source, and a voltage-to-current converter. The variable gap capacitor having a movable plate and a fixed plate separated by a variable gap that changes with charge modulation. The voltage bias provides a constant high voltage bias to the movable plate or the fixed plate of the variable gap capacitor while the modulated current source provides charge modulation during an actuation cycle to the other plate of the variable gap capacitor. The voltage-to-current converter converts a modulated voltage at the other plate of the variable gap capacitor to an output current. The MEMS actuator may further include a negative feedback sampling circuit coupled to the unit cell and configured to receive the output current, convert the output current from the unit cell to a low voltage signal, sample the low voltage signal, and provide a feedback signal to the modulated current source to compensate for the parasitic capacitance parallel to the unit cell.

In one embodiment, the method for charge-control actuation in a MEMS actuator may include activating at least one pixel in an array of pixels in response to a select signal, applying a voltage to one plate of the variable gap capacitor of the at least one pixel, to begin an actuation cycle, closing the switch of the at least one pixel to allow charge flow from the variable gap capacitor to the capacitor of the charge integration circuit, providing a corresponding voltage reading to the charge collected by the capacitor using the operational amplifier, comparing a predetermined voltage with the corresponding voltage reading from the operational amplifier using the comparator, generating an output signal from the comparator when the corresponding voltage reading reaches the predetermined voltage, and to end the actuation cycle, triggering the switch of the at least one pixel to open in response to the output signal. The method may further include the step of modulating the voltage from a high negative voltage to a low positive voltage to forward bias the diode and reset the variable gap capacitor.

In another embodiment, the method for charge-control actuation in a MEMS actuator may include activating at least one unit cell in an array of unit cells in response to a select signal, resetting the variable gap capacitor of the at least one unit cell by closing the reset switch of the at least one unit cell and applying a high voltage to the variable gap capacitor, opening the reset switch of the at least one unit cell to begin an actuation cycle and allow charge flow through the modulated current source and the actuation node of the at least one unit cell, outputting a current to the negative feedback sampling circuit, and determining a feedback signal for establishing a negative capacitance that compensates for the parasitic capacitance in the unit cell. The method may also include the step of converting the high voltage at the actuation node of the at least one unit cell to a low voltage signal prior to the step of determining a feedback signal of negative capacitance to the modulated current source. The method may further include sampling the low voltage signal on a capacitor in the negative feedback sampling circuit after the step of converting the high voltage at the actuation node of the at least one unit cell to a low voltage signal. Additionally, the method may also include converting the high voltage at the actuation node of the at least one unit cell to a current prior to the step of outputting the current to the negative feedback sampling circuit.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

In the description that follows, the present invention will be described in reference to a preferred embodiment that provides MEMS array actuation. The present invention, however, is not limited to any particular application nor is it limited by the examples described herein. Therefore, the description of the embodiments that follow are for purposes of illustration and not limitation.

A MEMS actuator is a micromechanical device that typically generates motion when voltage or charge is applied. A MEMS actuator may include a variable gap capacitor having a movable plate and a fixed plate separated by a variable gap. The movable plate moves when voltage or charge is applied to the variable gap capacitor, thereby changing the gap between the fixed plate and the movable plate. However, the gap may not increase monotonically as a function of voltage applied between the two plates. Instead, the travel range of the MEMS actuator may generally be limited to one third of the default gap size, reaching a tip in limit. In contrast, the gap increases monotonically as a function of charge, and as such, a charge-controlled actuator has no tip in limit.

Figure 1:
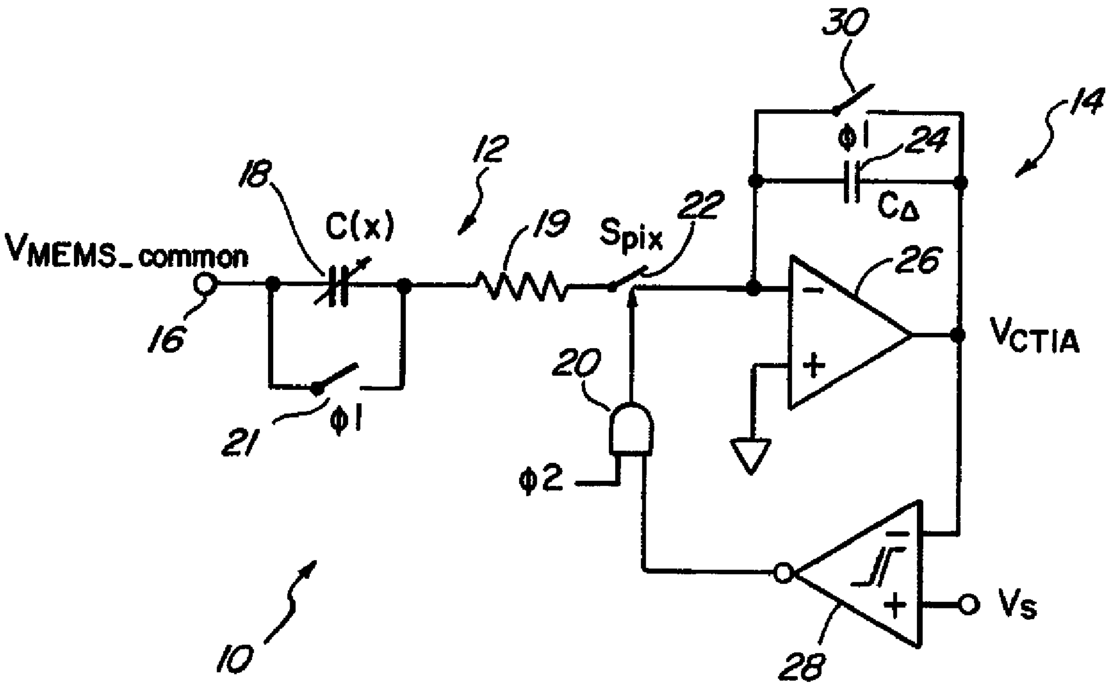
FIG. 1 is a MEMS actuator circuit suited for array implementation, according to one embodiment of the present disclosure.

According to a feature of the present disclosure, a system and method for MEMS array actuation is disclosed. FIG. 1 illustrates a charge controlled MEMS actuator circuit 10 suited for array implementation comprising a pixel 12 and a charge integration circuit 14. The pixel 12 may include a voltage bias 16, a variable gap capacitor 18, a resistor 19, a select logic gate 20, a reset switch 21, and a pixel switch 22. The charge integration circuit 14 may include a capacitor 24, an operational amplifier 26, a comparator 28, and a reset switch 30.

The variable gap capacitor 18 has a movable plate and a fixed plate separated by a variable gap that changes with charge modulation. In one embodiment, the variable gap capacitor 18 may be transparent to infrared light, reflecting outside a certain bandpass. The gap size corresponds to a transmission wavelength. By controlling the gap size, different color of light may be filtered and then detected by a broadband light sensor. In another embodiment, the variable gap capacitor may be configured for micro device applications with no light sensitivity.

The voltage bias 16 may provide a constant bias to the variable gap capacitor 18. The reset switch 21 is parallel with the variable gap capacitor 18 and configured to reset the variable gap capacitor 18 by removing all charge from it. Pixel switch 22 may be configured to begin an actuation cycle when closed and end the actuation cycle when opened. The actuation cycle initiates the flow of charge from the variable gap capacitor 18 to the charge integration circuit 14. When reset switch 21 is opened and pixel switch 22 is closed, a voltage gradient is established between the voltage bias 16 and node 23. According to an embodiment of the invention, node 23 couples the charge integration circuit 14 to the pixel 12. Resistor 19 may be used to convert low impedance node 23 into a high impedance node, so that the charge integration circuit 14 functions like a current source to the variable gap capacitor 18. Select logic gate 20 may be used to select a group, e.g. a row of pixels in a MEMS array actuation implementation.

The charge integration circuit 14 may be configured to modulate charge on the variable gap capacitor 18 during the actuation cycle. The charge integration circuit 14 may include capacitor 24, operational amplifier 26, comparator 28 and reset switch 30. The capacitor 24 may be configured to collect charge flowing from the variable gap capacitor 18 to the charge integration circuit 14 during the actuation cycle. The operational amplifier 26 is coupled to the capacitor 24 and may be configured to provide a corresponding voltage reading to the charge collected by the capacitor 24 and added to the variable plate capacitor 18. The comparator 28 compares a predetermined voltage $V_s$ with the corresponding voltage reading from the operational amplifier 26 and produces an output signal when the corresponding voltage reading reaches the predetermined voltage $V_s$. The output signal triggers the select logic gate 20 to open and end the actuation cycle. The reset switch 30 may be used to short capacitor 24 by closing the switch 30 after the actuation cycle ends to remove all charge from the plates of capacitor 24.

The charge on variable gap capacitor 18 may be determined by multiplying the predetermined voltage $V_s$ with the capacitance of capacitor 24. The gap between the plates of the variable gap capacitor 18 can therefore be adjusted via voltage $V_s$. The higher the predetermined voltage $V_s$, the longer it will take for the operational amplifier 26 to provide a corresponding voltage reading that is equal to the predetermined voltage $V_s$, and as such, more displacement of the movable plate will take place. In an implementation where the variable gap capacitor 18 is transparent to infrared light, reflecting outside a certain band pass, filtering and capturing a desired light color may be accomplished by adjusting the predetermined voltage $V_s$ so that a desired gap size is achieved. As can be envisioned by a person skilled in the art, the predetermined voltage $V_s$ may be used to control the gap between the plates of the variable gap capacitor 18 with no light filtration capability.

Figure 2:
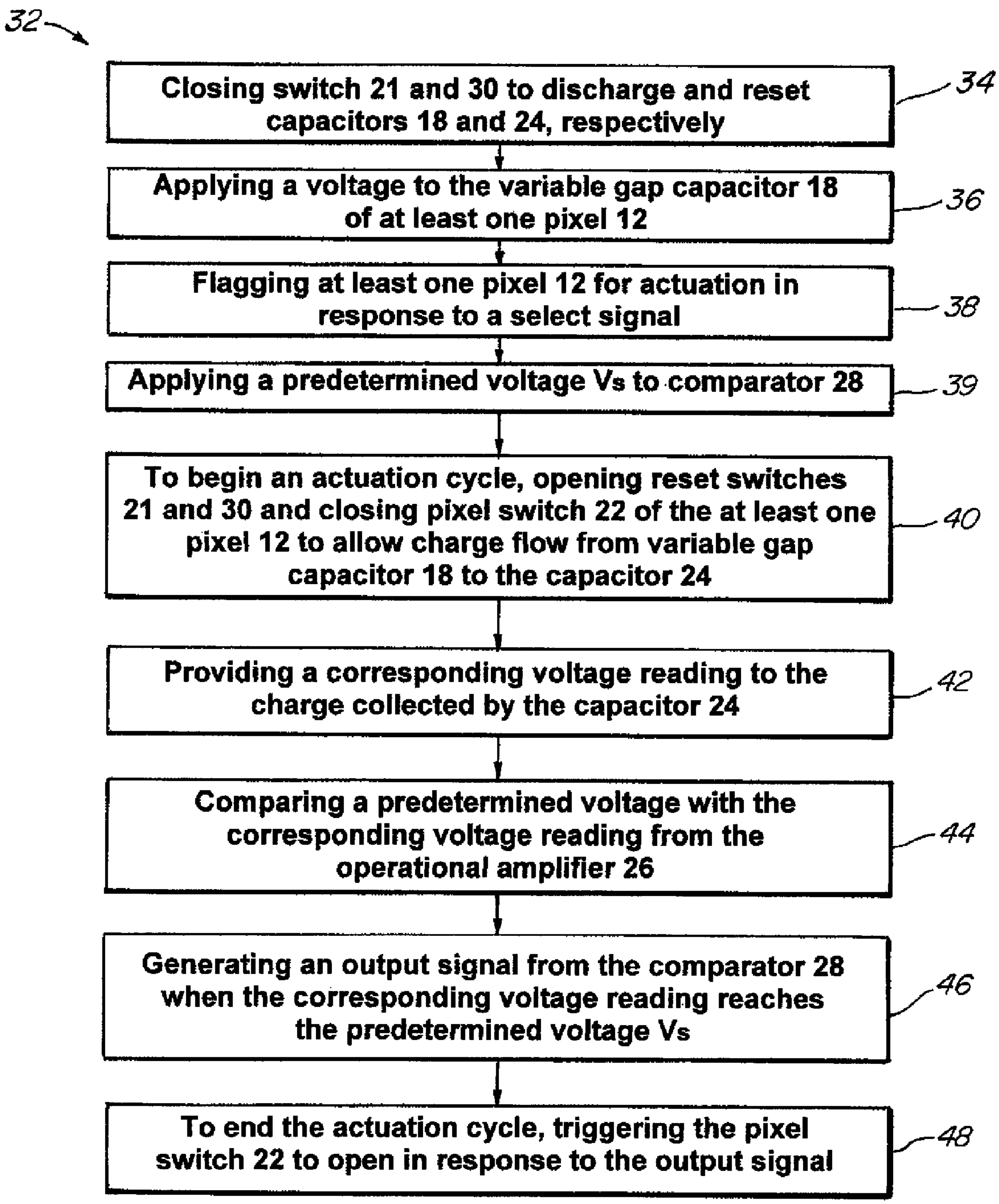
FIG. 2 is an exemplary flow chart outlining the operation of the MEMS actuator circuit of FIG. 1, according to one embodiment of the present disclosure.

FIG. 2 is an exemplary flow chart outlining the operation of the MEMS actuator circuit 10 of FIG. 1, according to one embodiment of the present disclosure. In operation, charge-control actuation in a MEMS actuator 10 begins with closing reset switch 21 and reset switch 30 to discharge and reset capacitors 18 and 24, respectively (34). Next, voltage bias 16 may be applied to all variable gap capacitors 18 of an array with the at least one pixel 12 (36). Then, at least one pixel 12 may be flagged for actuation in response to a select signal ϕ2 applied to logic gate 20 (38). A predetermined voltage $V_s$ may be applied to comparator 28 (39). To begin the actuation cycle, reset switch 21 and reset switch 30 are then opened and pixel switch 22 is closed (40). The charge then flows from variable gap capacitor 18 to capacitor 24. The operational amplifier 26 provides a corresponding voltage reading to the charge collected by the capacitor 24 (42). In one embodiment, the operational amplifier 26 forwards a negative reading to the comparator 28, which is then summed to the predetermined voltage $V_s$ (44). An output signal may be transmitted to the row select switch 20 when the sum is zero. Alternatively, the output signal may be transmitted when the corresponding voltage reading equals the predetermined voltage $V_s$ (46). The flagged select gate 20 triggers the pixel switch 22 to open and end the actuation cycle (48). Reset switch 21 and 30 are then closed again to discharge capacitors 18 and 24, before starting the next actuation cycle.

Figure 3:
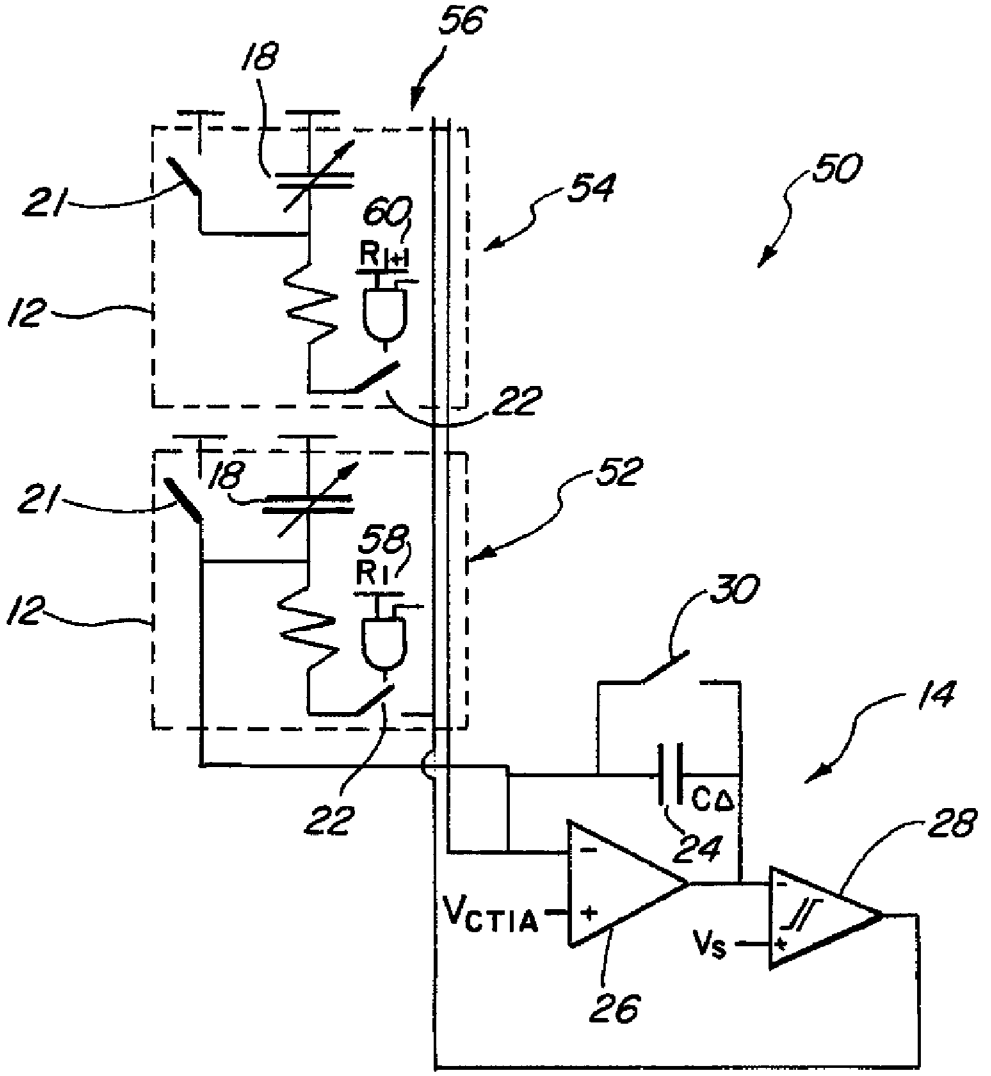
FIG. 3 is an exemplary MEMS array implementation with position control circuitry, according to one embodiment of the present disclosure.

FIG. 3 is an exemplary MEMS array implementation 50 with position control circuitry, according to one embodiment of the present disclosure. The MEMS array 50 may include a plurality of pixels 12 arranged in rows and columns and coupled to charge integration circuit 14. FIG. 3 illustrates a column 56 having two rows 52 and 54, each row 52 and 54 having at least one pixel 12. Row 52 may include a row select logic gate 58 and row 54 may include a row select logic gate 60. The charge integration circuit 14 may be shared between all pixels 12 of the MEMS array 50

In operation, charge-control actuation in the MEMS array 50 begins by activating one row 52 or 54 in response to a select signal from row select logic gate 58 or 60, respectively. The variable gap capacitors 18 in the row 52 or 54 are then discharged by shorting both plates to a voltage source via reset switch 21. After the reset switch 21 is opened again, to begin the actuation cycle, switch 22 is then closed to allow charge to flow from variable gap capacitors 18 to the capacitor 24. The operational amplifier 26 provides a corresponding voltage reading to the charge collected by the capacitor 24. The comparator 28 compares the predetermined voltage $V_s$ with the corresponding voltage reading, and transmits an output signal to the row select logic gates 58 or 60 to trigger the switch 22 to open and end the actuation cycle. At the end of the actuation cycle, capacitors 18 and 24 are in a stable state with a fixed capacitor gap where they remain until reset for the next actuation cycle.

As can be envisioned by a person skilled in the art, alternate activation sequences may be utilized to provide charge-control actuation in the MEMS actuator 10 and/or MEMS array 50. For example, charge-control actuation may begin by resetting the variable gap capacitors 18, resetting capacitor 24, selecting a predetermined voltage $V_s$, followed by activating one row 52 or 54 in response to a select signal from row select logic gate 58 or 60, respectively. A voltage bias may permanently be applied to the variable gap capacitors 18. To begin the actuation cycle, switch 22 is closed to allow charge to flow from variable gap capacitors 18 to the capacitor 24. The operational amplifier 26 provides a corresponding voltage reading to the charge collected by the capacitor 24. The comparator 28 compares the predetermined voltage $V_s$ with the corresponding voltage reading, and transmits an output signal to the row select logic gate 58 or 60 to trigger the switch 22 to open and end the actuation cycle.

Figure 4:
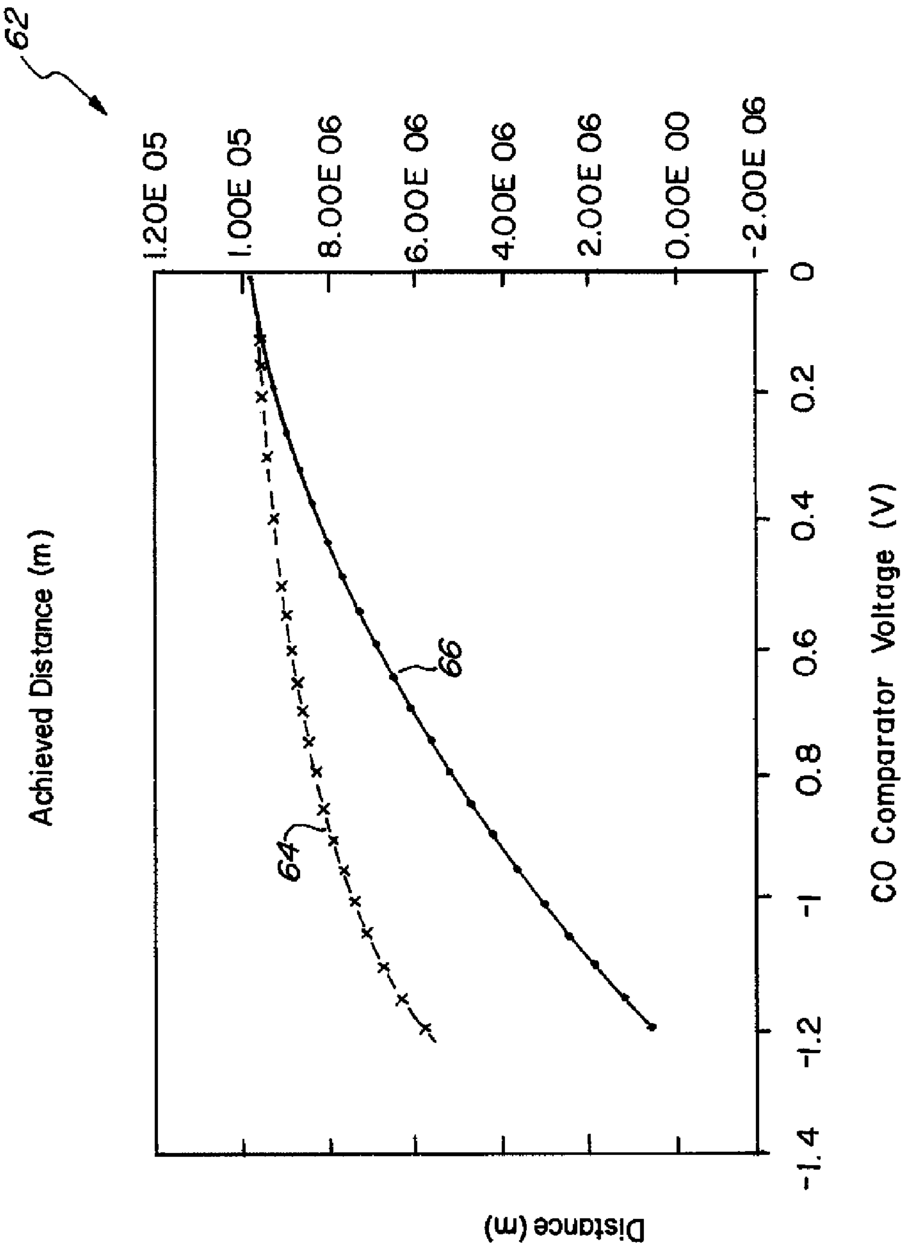
FIG. 4 is an exemplary graph illustrating the effect of parasitic capacitance on the minimum achievable gap between the plates of the variable gap capacitor of FIG. 1, according to one embodiment of the present disclosure.

FIG. 4 is an exemplary graph 64 illustrating the effect of parasitic capacitance on the minimum achievable gap between the plates of the variable gap capacitor of FIG. 1, according to one embodiment of the present disclosure. The vertical axis is the gap distance between the plates of the variable gap capacitor 18 and the horizontal axis is the comparator voltage $V_s$. Graph 62 shows two curves 64 and 66. Curve 64 illustrates the gap distance between the plates for a MEMS actuator 10 with a default capacitance of 100 fF in the non-actuated state and about 200 fF of parasitic capacitance in parallel. Curve 66 illustrates the gap distance between the plates for a MEMS actuator 10 having about 1 fF of parasitic capacitance. Curve 64 shows that for a comparator voltage $V_s$=−1.2, the distance between the plates is about 5.75 μm. Since the default distance between the plates is about 9.75 μm, the variable plate of the variable gap capacitor has moved a distance of about 4 μm. In contrast, curve 66 shows that for a comparator voltage $V_s$=−1.2, the distance between the plates is about 0.5 μm. Since the default distance between the plates is about 9.75 μm, the variable plate of the variable gap capacitor has moved a distance of about 9.25 μm. In this illustration, curve 66 corresponds to a capacitor plate distance of about 9.25 μm, which translates to about 95% of the default gap size, while curve 64 corresponds to a capacitor plate distance of about 4 μm, which translates to about 71% of the default gap size. Hence, graph 62 demonstrates that the MEMS actuator 10 of FIG. 1 overcomes the voltage mode actuation tip in limit of one third of the default gap size. However, the variable plate displacement depends on the ratio of the parasitic capacitance to the default MEMS actuator capacitance. The greater the parasitic capacitance in the MEMS actuator circuit 10, the lesser the displacement of the variable plate, and as such, the greater the gap between the plates.

Figure 5:
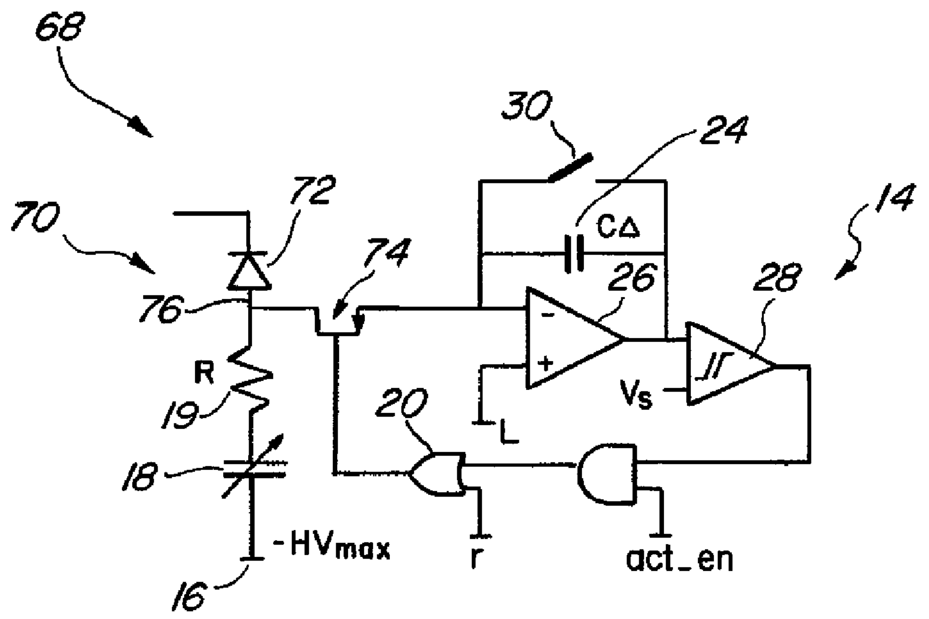
FIG. 5 is a MEMS actuator circuit suited for small pixel integration, according to one embodiment of the present disclosure.

Electrostatic position control of a MEMS actuator may require high voltages, especially if the movable plate capacitor is small. Unfortunately high voltage devices have a large footprint and increase the minimum achievable unit cell size. FIG. 5 is a MEMS actuator circuit 68 suited for integration in a small pixel, according to one embodiment of the present disclosure. The MEMS actuator 68 may include a pixel 70 and charge integration circuit 14. The pixel 70 may include high voltage bias 16, variable gap capacitor 18, resistor 19, row select switch 20, a diode 72 and a pixel transistor switch 74. The charge integration circuit 14 may include capacitor 24, operational amplifier 26, comparator 28, and reset switch 30.

In one embodiment, the diode 72 may be used to reset the variable gap capacitor 18. By adjusting the high voltage bias 16 in the pixel 70 to forward bias the diode 72, the variable gap capacitor 18 may reset, thereby initializing the charge on the capacitor 18 to a predetermined level. The diode 72 may, for example, be the drain to well diode of a PMOS-switch 74. The pixel transistor switch 74 may be configured to begin an actuation cycle when closed and end the actuation cycle when opened. The actuation cycle initiates the flow of charge from the variable gap capacitor 18 to the charge integration circuit 14.

Figure 6:
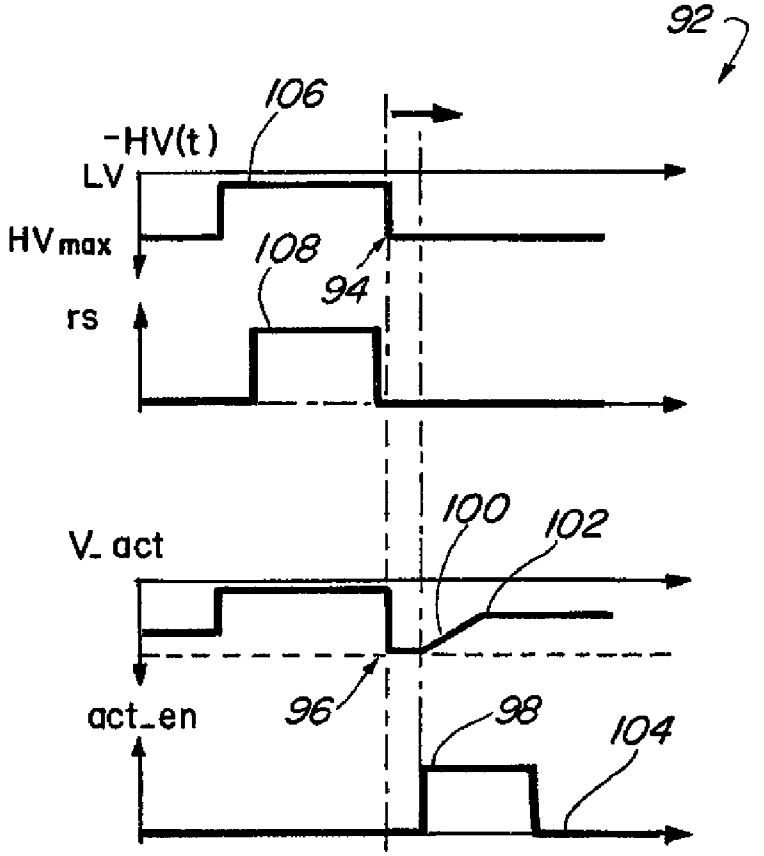
FIG. 6 is a timing diagram of the logic levels for the MEMS actuator circuit of FIG. 5, according to an embodiment of the disclosure.
Figure 7:
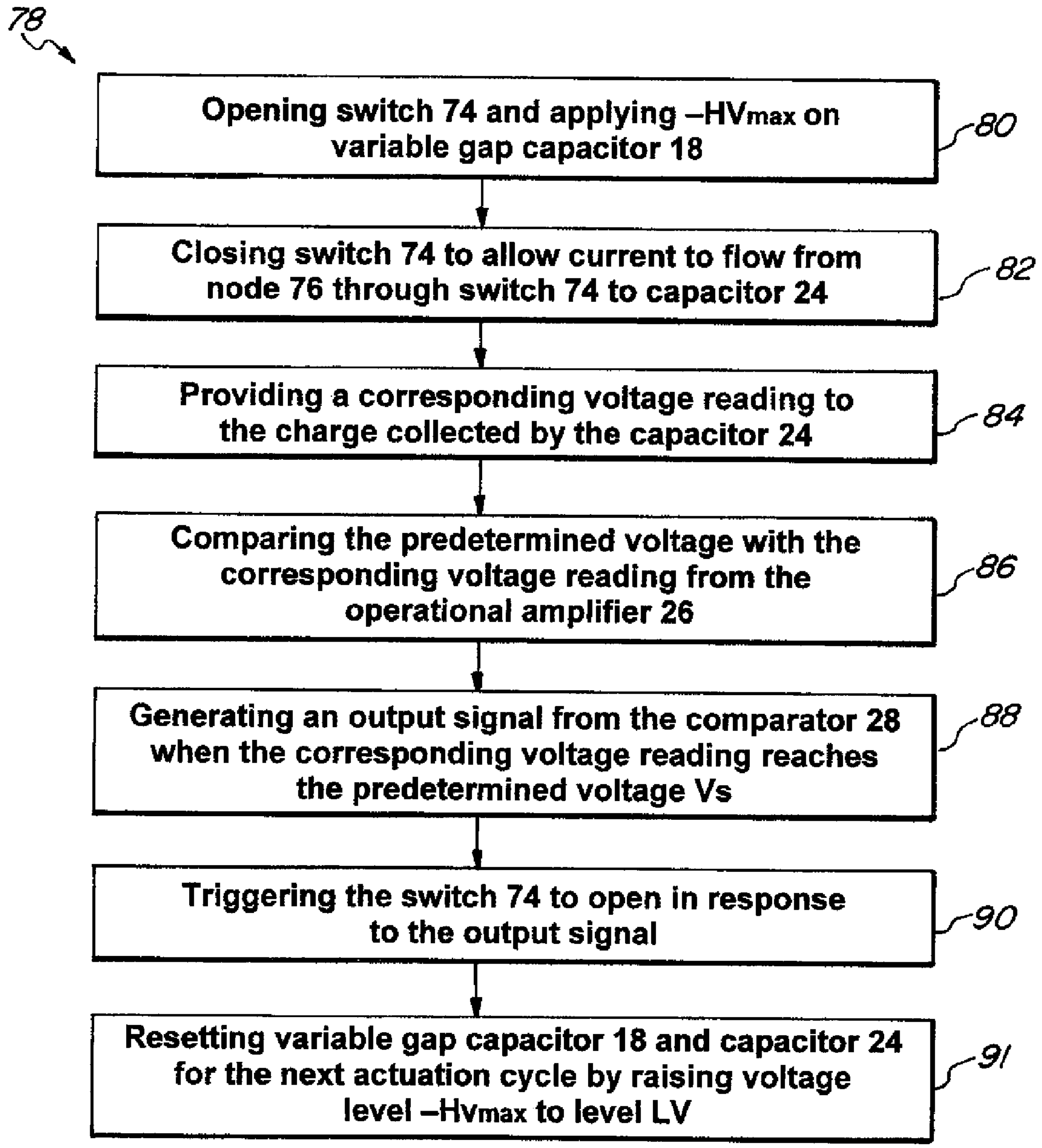
FIG. 7 is an exemplary flow chart outlining the operation of the MEMS actuator circuit of FIG. 5, according to one embodiment of the present disclosure.

FIG. 6 is a timing diagram 92 of the logic levels for the MEMS actuator circuit 68 of FIG. 5, according to an embodiment of the disclosure. FIG. 7 is an exemplary flow chart 78 outlining the operation of the MEMS actuator circuit 68 of FIG. 5. In operation, the pixel transistor switch 74 is opened and a negative high voltage ($-HV_{max}$) is applied to variable gap capacitor 18 (80). This is illustrated in FIG. 6 at 94 for negative voltage applied to the variable gap capacitor 18 and at 96 showing the negative voltage potential resulting on node 76. In one embodiment, the negative high voltage ($-HV_{max}$) may be about −65V. Next, the pixel transistor switch 74 is clocked high 98 to start the actuation cycle. This closes the switch 74 to allow current to flow from node 76 through switch 74 to capacitor 24 (82). The voltage at node 76 gradually increases, as shown by the upward sloped line 100 in FIG. 6, until the voltage at the output of operational amplifier 26 reaches the predetermined voltage $V_s$, as shown by the horizontal line 102 in FIG. 6. During the gradual increase in the voltage at node 76, the operational amplifier 26 provides a corresponding voltage reading to the charge collected by the capacitor 24 (84). In one embodiment, the operational amplifier 26 forwards the voltage reading to the comparator 28, which compares it with predetermined voltage $V_s$ (86). An output signal may be transmitted when the corresponding voltage reading reaches the predetermined voltage $V_s$ (88). Next, the pixel transistor switch 74 is opened by clocking logic signal "act_en" low 104, ending the actuation cycle (90).

To reset the variable gap capacitor 18 for the next actuation cycle, the voltage bias 16 in the pixel 70 is increased to a low voltage (LV) causing the diode 72 to become forward biased (91). This is illustrated in FIG. 6 at 106 for low voltage (LV) applied to the variable gap capacitor 18. The low voltage (LV) may be a low positive or negative voltage. In one embodiment, a positive low voltage (LV) may be about +0.8V. By modulating the voltage from a high negative voltage to a low voltage, current flows through the diode 72 and discharges the variable gap capacitor 18. With a short delay relative to the rising edge 106, the reset switch 30 is also clocked high 108 to discharge and reset capacitor 24 for the next actuation cycle.

Figure 8:
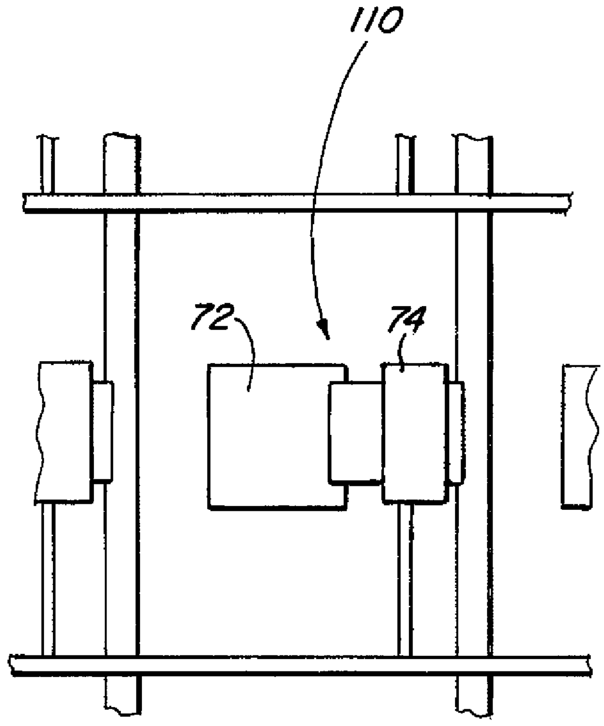
FIG. 8 is an exemplary layout of a unit pixel cell suited for implementation with the MEMS actuator circuit of FIG. 5, according to one embodiment of the present disclosure.

FIG. 8 is an exemplary layout of a unit pixel cell 110 suited for implementation with the MEMS actuator circuit 68 of FIG. 5, according to one embodiment of the present disclosure. In one implementation, the unit pixel cell 110 may have a dimension of 42 μm by 22 μm. The unit pixel cell 110 may have a single high-voltage PMOS transistor. By decreasing the pixel size, parasitic capacitances in an array of MEMS actuators 68 may be decreased and the MEMS actuator travel range before tip in may be increased.

Figure 9:
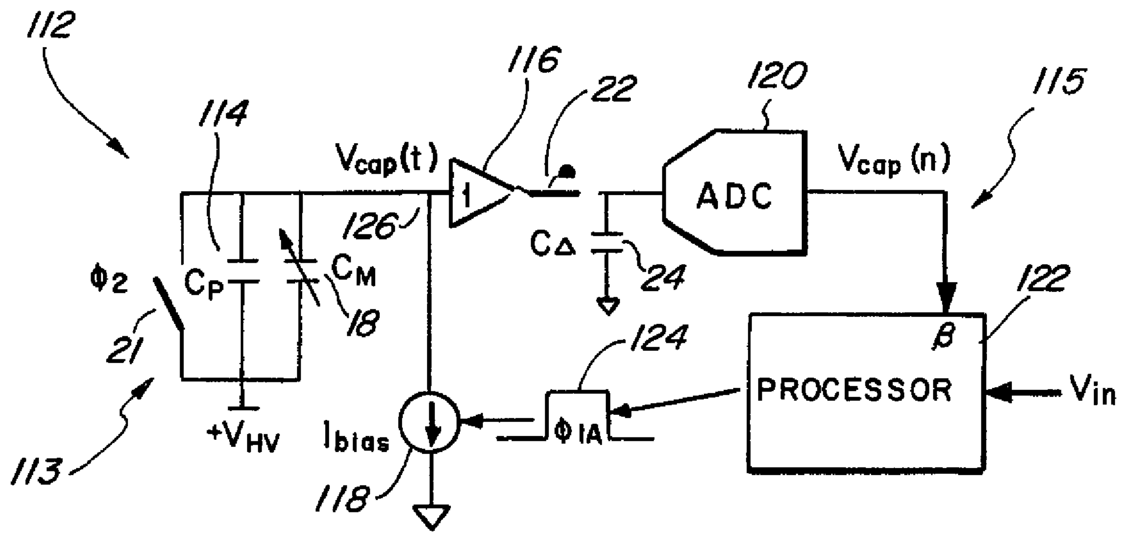
FIG. 9 is a MEMS actuator circuit with a digital negative feedback loop, according to one embodiment of the present disclosure.

According to one embodiment, the effect of a parasitic capacitance may also be decreased using a negative feedback loop. FIG. 9 is a MEMS actuator circuit 112 with a digital negative feedback loop, according to one embodiment of the present disclosure. The MEMS actuator 112 may include a unit cell 113 with parasitic capacitance and a negative feedback sampling circuit 115. The unit cell 113 may include variable gap capacitor 18, parasitic capacitance 114, a high voltage buffer 116, a reset switch 21, a pixel switch 22, and a modulated current source 118. The negative feedback sampling circuit 115 may be coupled to the unit cell 113. The negative feedback sampling circuit 115 may include capacitor 24, an analog to digital converter 120, and a processor 122.

The high voltage buffer 116 may be used to provide a corresponding voltage reading of the voltage on node 126. The modulated current source ($I_{bias}$) 118 may be used to charge the variable gap capacitor 18 during an actuation cycle. The charge modulation may be used to compensate for parasitic capacitance 114 in the MEMS actuator 112 by providing negative capacitance characteristics in parallel to the variable gap capacitor.

The capacitor 24 may be used to sample and hold a value representing the charge flowing from the variable gap capacitor 18 and parasitic capacitance 114 to the negative feedback sampling circuit 115 during the actuation cycle to provide a representative value of the voltage $V_{cap}(t)$ at node 126. The analog to digital converter 120 may be used to convert the voltage signal stored on capacitor 24 to a digital value $V_{cap}(n)$ that is then forwarded to digital processor 122.

Processor 122 may be used to control the negative feedback sampling circuit 115. In one embodiment, processor 122 may be used to introduce a predetermined input voltage signal $V_{in}$, such as the predetermined voltage $V_s$, into the negative feedback sampling circuit 115. Using the predetermined input voltage signal $V_{in}$, processor 122 may then determine a feedback signal 124 to the modulated current source 118 to compensate for the parasitic capacitance in the unit cell 113. For example, the processor 122 may compute the feedback signal 124 by executing an algorithm or a functional representation of the sample domain circuit to provide negative capacitance in the circuit for cancelling out the parasitic capacitance 114. In one embodiment, the feedback signal 124 determines the "ON" time $t_{\phi A}$ of the modulated current source ($I_{bias}$) 118 applied to node 126. Processor 122 may compute the duration $t_{\phi A}$ using the following expression:

$$t_{\phi A} = \left[\frac{C_P}{I_{Bias}}\right]_{estim} [V_{cap}(n-1) + V_{in}] \qquad (1)$$

where, $t_{\phi A}$ is the "ON" time of modulated current source ($I_{bias}$) 118 applied to node 126 to provide negative capacitance, $C_P$ is an estimate of the parasitic capacitance 114, $I_{bias}$ is the modulated current source 118, $$\left[\frac{C_P}{I_{Bias}}\right]_{estim}$$

is a parameter determining the voltage swing and frequency of the feedback loop, $V_{cap}(n-1)$ is the digital representation of the voltage at capacitor 24 in the n−1 cycle, and $V_{in}$ is the predetermined input voltage signal and the external parameter that defines the position of the variable gap capacitor.

Figure 10:
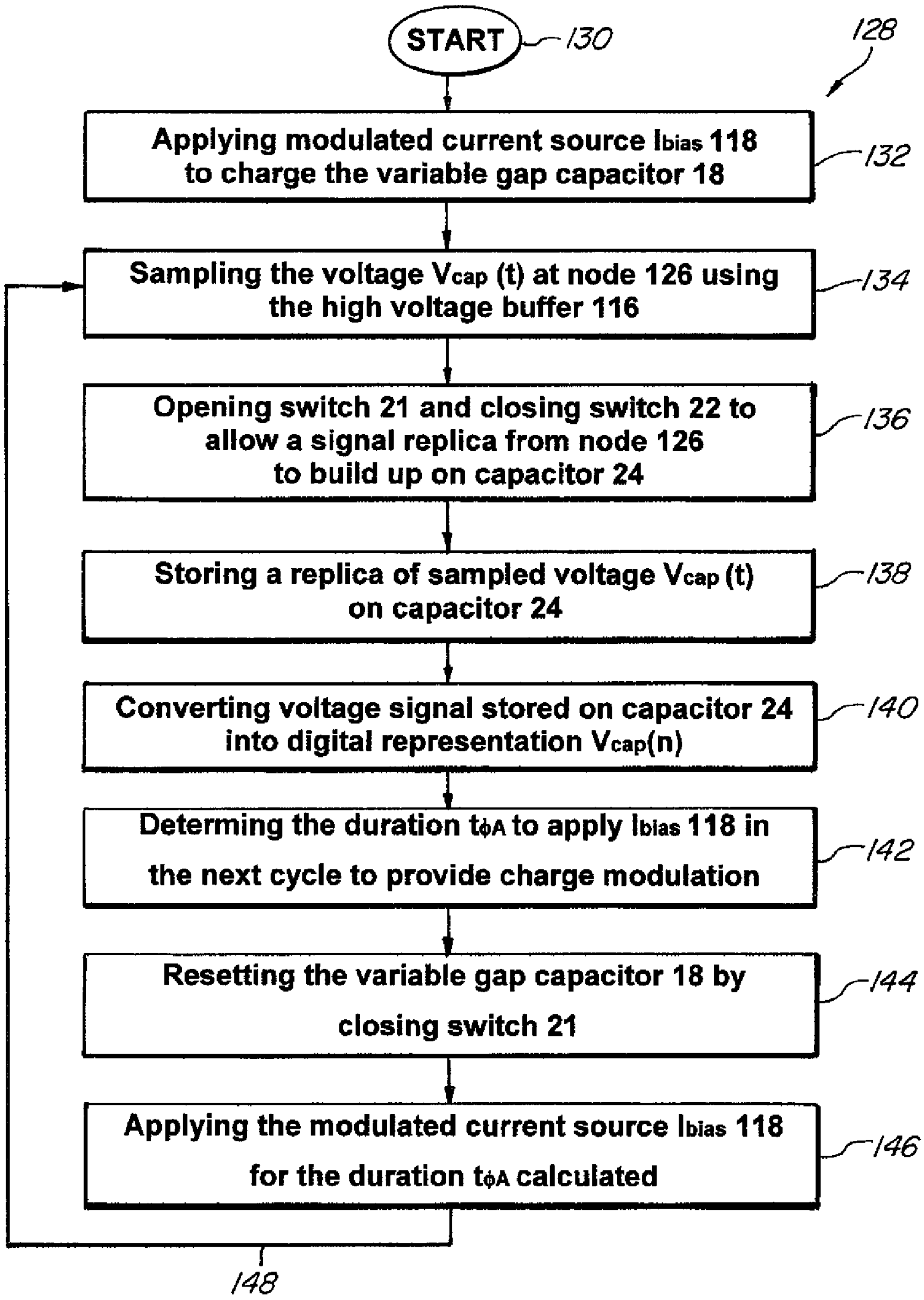
FIG. 10 is an exemplary flow chart outlining the operation of the MEMS actuator circuit of FIG. 9, according to one embodiment of the present disclosure.

FIG. 10 is an exemplary flow chart 128 outlining the operation of the MEMS actuator circuit 112 of FIG. 9. In operation, the MEMS actuator 112 begins (130) by applying the modulated current source ($I_{bias}$) 118 to charge the variable gap capacitor 18 (132). The voltage $V_{cap}(t)$ at node 126 is then sampled and converted into a low voltage signal using the high voltage buffer 116 (134). Next, switch 21 is opened and pixel switch 22 is closed to allow a signal replica from node 126 to build up on capacitor 24 (136). The capacitor 24 stores a replica of the sampled voltage $V_{cap}(t)$ (138). Next, the voltage signal stored on capacitor 24 is converted into a digital representation $V_{cap}(n)$ by the analog to digital converter 120 (140). The digital representation $V_{cap}(n)$ is then forwarded to the digital processor 122. Processor 122 may be used to determine the duration time $t_{\phi A}$ of modulated current source ($I_{bias}$) 118 applied to node 126 in the next cycle to provide charge modulation (142). The variable gap capacitor 18 is then reset by closing switch 21 (144). The modulated current source ($I_{bias}$) 118 is then applied to node 126 for the duration $t_{\phi A}$ calculated (146). Steps (134) to (146) are repeated continuously to provide negative capacitance in the circuit for cancelling out the parasitic capacitance 114 (148).

Figure 11:
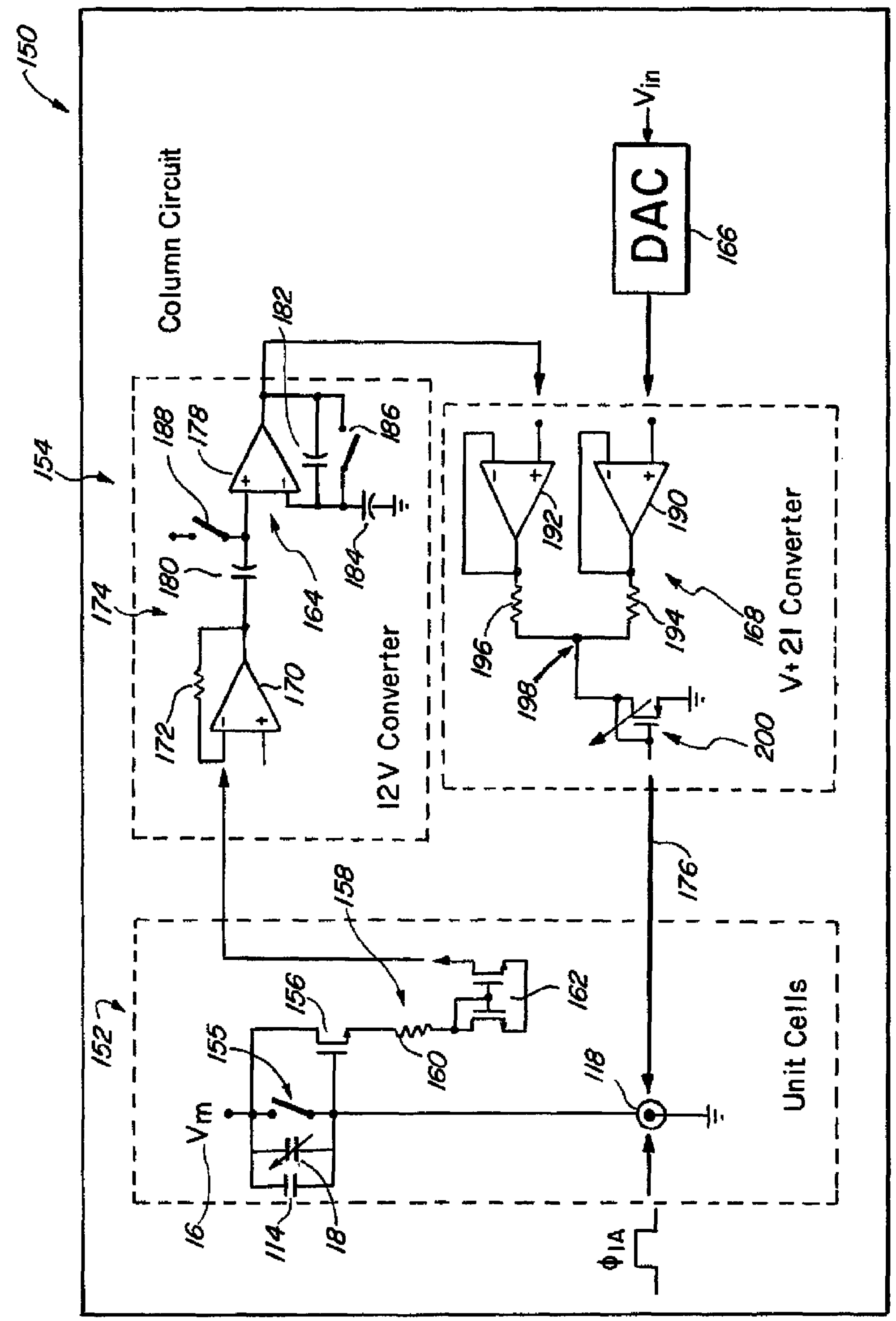
FIG. 11 is a MEMS actuator circuit with an analog negative feedback loop, according to one embodiment of the present disclosure.

FIG. 11 is a MEMS actuator circuit 150 with an analog negative feedback loop, according to one embodiment of the present disclosure. The MEMS actuator 150 may include a unit cell 152 and a negative feedback sampling circuit 154. The unit cell 152 may include variable gap capacitor 18, parasitic capacitance 114, voltage bias 16, modulated current source 118, a reset gate 155, a source follower 156, a voltage-to-current converter 158 and a current mirror 162.

In one embodiment, the voltage bias 16 may provide a constant high voltage bias to one of the movable plate or the fixed plate of the variable gap capacitor 18, while the modulated current source 118 provides charge modulation during an actuation cycle to the other plate of the variable gap capacitor 18. The constant high voltage bias may, for example, be about +65V. The reset gate 155 may be used to modulate the voltage bias 16 by opening/closing to provide the voltage bias 16 as a function of time. The source follower 156 may be used to measure the voltage across the variable gap capacitor 18 and buffer the voltage to the voltage-to-current converter 158. In one embodiment, the voltage-to-current converter 158 may include a resistor 160. The current mirror 162 may be used to transmit the output current from the unit cell 152 to the negative feedback sampling circuit 154 for signal processing.

The negative feedback sampling circuit 154 may be coupled to the unit cell 152 and configured to receive the output current from the unit cell 152, convert it into a low voltage signal 174, sample the low voltage signal 174, and provide a feedback signal 176 to the modulated current source 118 to compensate for the parasitic capacitance in the unit cell 152. The negative feedback sampling circuit 154 may include a current-to-voltage converter 172, a programmable gain providing double sampling circuit 164, a digital-to-analog converter 166, and an analog summation circuit 168.

In one embodiment, the negative feedback sampling circuit 154 may include a transimpedance amplifier comprising an operational amplifier 170 and a feedback resistor 172. The transimpedance amplifier 170 may be used to convert the output current from the current mirror 162 to a low voltage signal 174. For example, the low voltage signal 174 may be no higher than about 3.3V. In one embodiment, the programmable gain double sampling circuit 164 may include a differential amplifier 178, capacitors 180, 182 and 184, and reset switches 186 and 188. Reset switches 186 and 188 may be used to control the operation sequence of the double sampling circuit 164. Switches 186 and 188 may be closed to reset the capacitors 180, 182 and 184 for a reset value readout and opened to allow capacitors 180, 182 and 184 to sample hold the signal value transmitted from the unit cell 152. The differential amplifier 178 in combination with capacitors 182 and 184 may be used to provide gain to the offset corrected output signal $V_{out}$(n−1), from a previous cycle.

The digital-to-analog converter 166 may be used to introduce a digitally programmable input voltage signal $V_{in}$ into the analog negative feedback sampling circuit 154. The digital-to-analog converter 166 may then transmit the predetermined input voltage signal $V_{in}$ in its analog representation into the analog summation circuit 168. In one embodiment, the analog summation circuit 168 may include a first differential amplifier 190, a second differential amplifier 192, and resistors 194 and 196, forming two independent transconductance stages, respectively. The first transconductance stage with first differential amplifier 190 may receive the predetermined input voltage signal $V_{in}$ from the digital-to-analog converter 166. The second transconductance stage with second differential amplifier 192 may receive the offset corrected output voltage $V_{out}$(n−1) from a previous charge modulation cycle. The resistors 194 and 196 may be used to convert the voltage signals into current signals, which are then summed at node 198 to provide a feedback signal 176 for the modulated current source $I_{bias}$ 118. In one embodiment, an equivalent transconductance is applied to the voltage $V_{in}$ and voltage $V_{out}$(n−1). For example, the analog summation circuit 168 may be used to determine the feedback signal 176 for the modulated current source $I_{bias}$ 118 using the following expression:

$$V_{in}\cdot G_1+V_{out}(n-1)\cdot G_2=I_{bias}$$

where, $V_{in}$ is a voltage produced by the digital-to-analog converter, $V_{out}$(n−1) is a voltage measured by the double sampling circuit, $G_1$ is an equivalent transconductance applied to the voltage $V_{in}$, $G_2$ is an equivalent transconductance applied to the voltage $V_{out}$(n−1), n is an index identifying the charge-control actuation cycle in the MEMS actuator circuit, and $I_{bias}$ is the modulated current source.

In one embodiment, the negative feedback sampling circuit 154 may include a current mirror 200 for transmitting the output feedback signal 176 from the negative feedback sampling circuit 154 to the unit cell 152. The current mirror 200 may be used to close the negative feedback loop to provide the characteristics of negative capacitance in the circuit parallel to the movable plate capacitor 18 and cancelling out parasitic capacitance 114.

Figure 12:
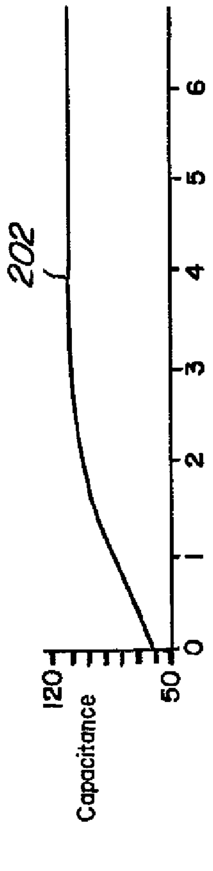
FIG. 12 illustrates the change in capacitance for one actuation cycle over time on the variable gap capacitor of FIG. 11, according to one embodiment of the present disclosure.
Figure 13:
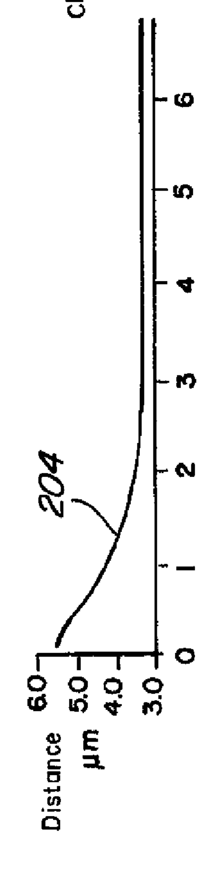
FIG. 13 illustrates the distance, for one actuation cycle, between the plates of the variable gap capacitor of FIG. 11, according to one embodiment of the present disclosure.

FIG. 12 illustrates a curve 202 for the change in capacitance over time on the variable gap capacitor 18 of FIG. 11. FIG. 13 illustrates a curve 204 for the distance between the plates of the variable gap capacitor 18 of FIG. 11 over time. FIGS. 12 and 13 illustrate how the capacitance of the variable gap capacitor 18 increases with decreasing gap between the plates of the variable gap capacitor 18 throughout an actuation cycle. FIG. 13 also illustrates the gap size between the plates moved to about 3 μm from the default gap size of about 11 μm, which translates to about 73% of the default gap size. Hence, FIG. 13 demonstrates that the MEMS actuator 150 of FIG. 11 overcomes the voltage actuation tip in limit of one third of the default gap size.

Figure 14:
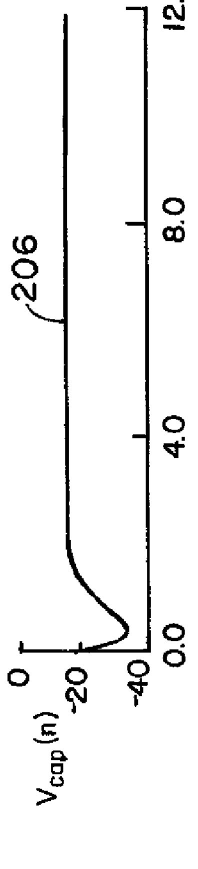
FIG. 14 illustrates the sequence of voltages on the variable gap capacitor of FIG. 11 during the current OFF phase, according to one embodiment of the present disclosure.
Figure 17:
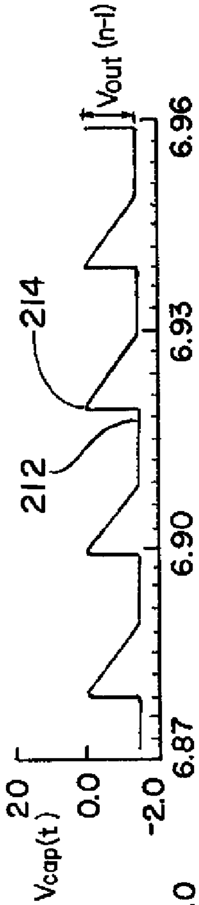
FIG. 17 illustrates a segment of the sequence of voltages on the variable gap capacitor during the current ON and OFF phases, according to one embodiment of the present disclosure.

FIG. 14 illustrates a curve 206 of the sequence of voltages on the variable gap capacitor 18 of FIG. 11 during the current OFF phase. FIG. 17 illustrates a segment of the curve in FIG. 14. As shown in FIG. 17, the voltage difference $V_{out}$(n−1) is the difference between the signal value readout 212 and the reset value readout 214 measured by the double sampling circuit 164.

Figure 15:
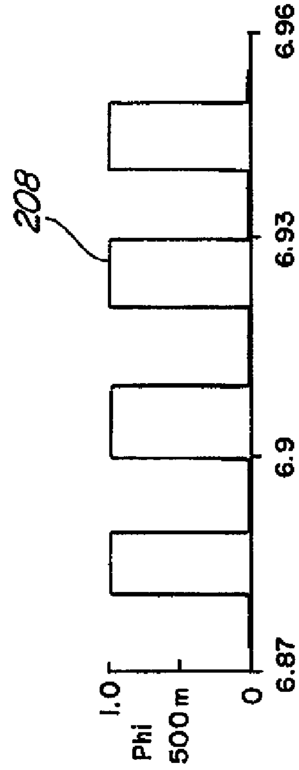
FIG. 15 illustrates a timing diagram for switch Phi of FIG. 11 controlling the feedback signal for the modulated current source, according to an embodiment of the disclosure.
Figure 16:
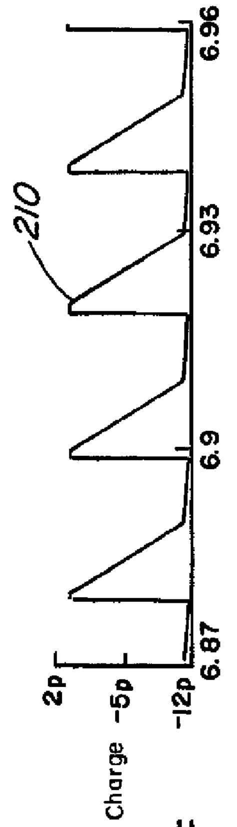
FIG. 16 illustrates the charge on the variable gap capacitor of FIG. 11, according to one embodiment of the present disclosure.

In one embodiment, the current source $I_{bias}$ 118 may be modulated with a logic control signal. FIG. 15 illustrates a timing diagram 208 of the logic control signal controlling the ON/OFF state of the modulated current source $I_{bias}$ 118 of FIG. 11. The logic control signal may also be used to direct current $I_{bias}$ to a unit cell 152 in an array implementation. As can be envisioned by a person skilled in the art, the MEMS actuator circuit 150 may include a pixel array with a plurality of unit cells 152 coupled to the negative feedback sampling circuit 154. The modulated current source $I_{bias}$ 118 may be directed to the unit cell 152 when the logic control signal is clocked high. In this implementation the logic control signal may provide pixel select functionality when several pixels are arranged in an array. For array operation, the pixel switch may then be closed to connect a unit cell 152 with the current sourced $I_{bias}$ 118, which is part of the column circuitry. In one embodiment, the MEMS actuator circuit 150 may actuate a first unit cell 152 by closing the pixel switch and providing the modulated current source $I_{bias}$ 118 to the first unit cell 152, then leave the first unit cell 152 passive by opening the pixel switch and moving on to a second unit cell 152 in the pixel array. In one implementation, the MEMS actuator circuit 154 transmits the modulated current source $I_{bias}$ 118 sequentially to all the unit cells 152 in the pixel array. After the unit cell 152 is left passive for a period of time, the MEMS actuator circuit 150 may then be connected to it again by clocking the pixel switch high, at a later time, to provide current $I_{bias}$ to the unit cell 152, as shown in FIG. 15. FIG. 16 illustrates a curve 210 of the charge on the variable gap capacitor 18 as the pixel switch is clocked high and low to control the modulated current source $I_{bias}$ 118.

Figure 18:
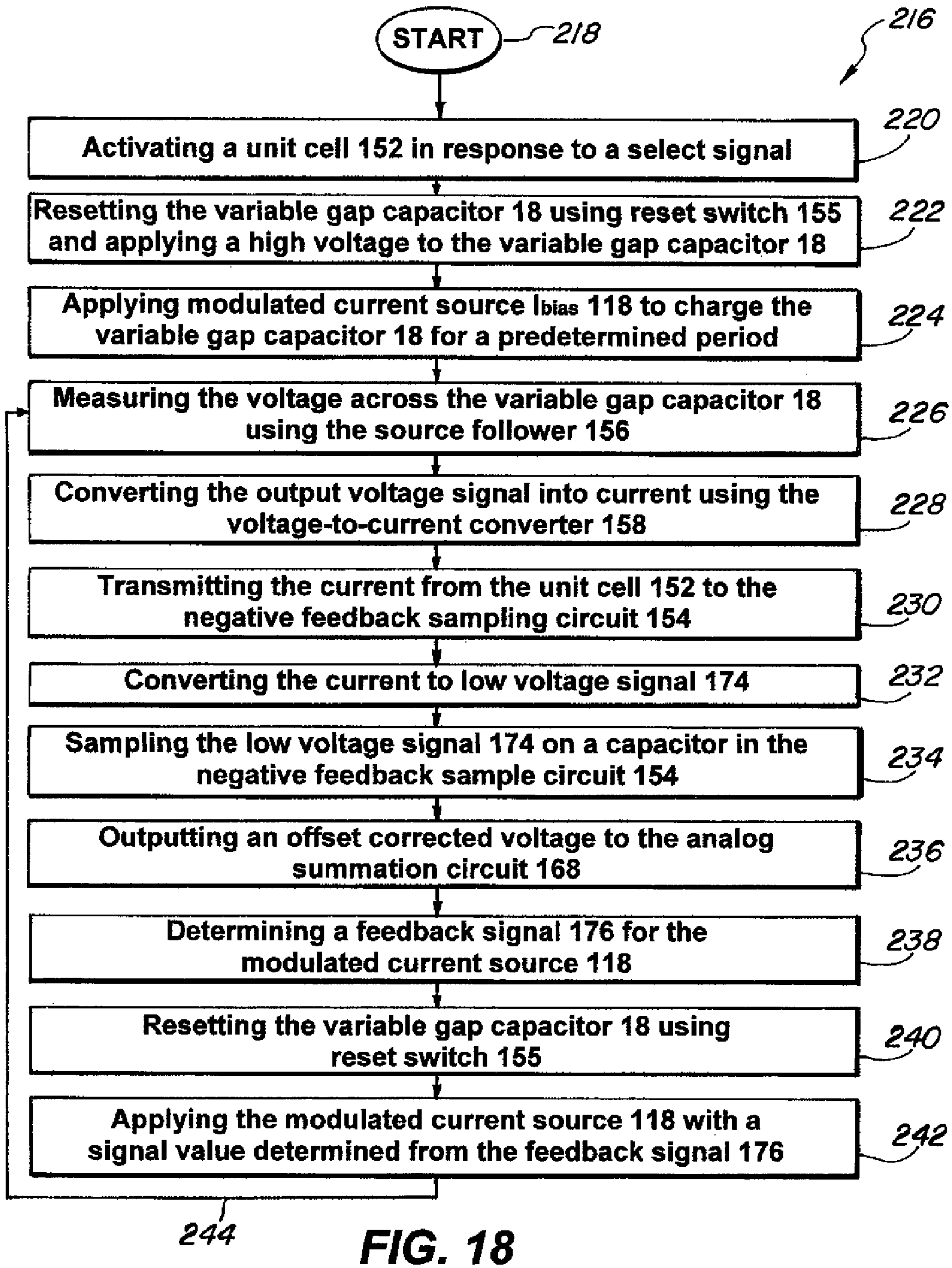
FIG. 18 is an exemplary flow chart outlining the operation of the MEMS actuator circuit of FIG. 11, according to one embodiment of the present disclosure.

FIG. 18 is an exemplary flow chart 216 outlining the operation of the MEMS actuator circuit 150 in an array implementation. In operation, the MEMS actuator circuit 154 begins (218) by activating unit cell 152 in response to a select signal (220). Next, resetting the variable gap capacitor 18 using reset switch 155 and shorting the 2 plates of the variable gap capacitor 18 (222). When reset, the plates of the variable gap capacitor 18 are in default position (i.e. not actuated) and no charge is stored on the capacitor plates.

Next, the modulated current source ($I_{bias}$) 118 is applied to charge the variable gap capacitor 18 for a predetermined period (224). For example, a pixel switch controlling the ON/OFF switching of the modulated current source $I_{bias}$ 118 may have a clock cycle illustrated in FIG. 15. By turning ON the modulated current source $I_{bias}$ 118, the charge on the variable gap capacitor 18 increases, as shown in FIG. 16. The modulated current source $I_{bias}$ 118 is then turned OFF and the voltage across the variable gap capacitor 18 is measured using the source follower 156 (226). Next, the voltage output signal is converted to current using, for example, the voltage-to-current converter 158 (228). In one embodiment, the current may be mirrored in the unit cell 152 and then transmitted to the negative feedback sampling circuit 154 (230).

The negative feedback sampling circuit 154 may then convert the current received to a low voltage signal 174 using, for example, a transimpedance amplifier made of differential amplifier 170 and resistor 172 (232). Next, the low voltage signal is sampled on a capacitor of the double sampling circuit 164 (234), and a differential amplifier 178 outputs an offset corrected voltage to the analog summation circuit 168 (236). In one embodiment, the double sampling circuit 164, such as a switch cap circuit may provide gain to create the output voltage $V_{out}(n-1)$. The voltage output $V_{out}(n-1)$, along with the voltage introduced by the digital-to-analog converter $V_{in}$, may then be converted to current and combined at node 198 to provide a feedback signal 176 to the modulated current source $I_{bias}$ 118 for the next actuation cycle (238).

In one embodiment, the reset switch 155 is switched ON to discharge the variable gap capacitor 18 (240). The plates of the variable gap capacitor 18 may not immediately move into a position corresponding to the new charge state, but may remain at the position to which they moved during the previous actuation cycle. After the plates are reset, the logic signal controlling the ON/OFF switching of the modulated current source $I_{bias}$ 118 may turn ON again and provide a current determined by the feedback signal 176 (242). Steps (226) to (242) may be repeated infinitely to continuously provide negative capacitance in the circuit for cancelling out the parasitic capacitance 114 (244). At some point in time, equilibrium position for the movable plate will be reached and the gap between the plates of the variable gap capacitor 18 will remain constant, as shown in FIG. 13. Likewise, the average voltage on and capacitance of the variable gap capacitor 18 will reach an equilibrium state, as shown in FIGS. 12 and 14 respectively.

In one embodiment, it may be desired to move the capacitor plate to a new position. In such instance, a new $V_{in}$ may be programmed and introduced into the negative feedback sampling circuit 154. The actuation cycle will begin with the new $V_{in}$ until a new equilibrium position is reached for the movable plate of the variable gap capacitor 18.

As can be appreciated by a person skilled in the art, the present disclosure provides multiple exemplary embodiments of the MEMS actuators. For example, the MEMS actuators may be suited for array implementation. The unit pixel may be designed to have one node coupled to the pixel switch to facilitate array implementation. In one embodiment, the MEMS actuator circuit may actuate a first unit cell, close the pixel switch providing the modulated current source $I_{bias}$ to the first unit cell, then leave the first unit cell passive and move on to a second unit cell in the pixel array. Another embodiment may include performing signal processing at a low voltage level while operating the unit cell at a high voltage. Signal processing may provide negative capacitance characteristics in the circuit for cancelling out parasitic capacitance. In one embodiment, the MEMS actuator circuit may also be suitable for analog implementation of charge mode actuation using current modulation. As is understood by a person skilled in the art, the various embodiments of the MEMS actuator overcome the tip in limit of one third of the default gap size.

As can be envisioned by a person skilled in the art, applications for the invention include, but are not limited to, analog position control of micro mirror arrays with low voltage, high resolution and small pixel pitch. Applications may also include programmable optics, such as MEMS based compensation membrane in active optics or mirrors with programmable focal length. Additionally, applications may include pixel level programmable spectrometer.

While the system and method for MEMS array actuation have been described in terms of what are presently considered to be the most practical and preferred embodiments, it is to be understood that the disclosure need not be limited to the disclosed embodiments. It should also be understood that a variety of changes may be made without departing from the essence of the invention. Such changes are also implicitly included in the description. They still fall within the scope of this disclosure. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action. Similarly, each physical element disclosed should be understood to encompass a disclosure of the action which that physical element facilities.

It should be understood that various modifications and similar arrangements are included within the spirit and scope of the claims, the scope of which should be accorded the broadest interpretation so as to encompass all such modifications and similar structures. The present disclosure includes any and all embodiments of the following claims.

The invention claimed is:

1. A MEMS actuator comprising:

a pixel comprising:

a voltage bias, a variable gap capacitor having first and second terminals, said variable gap capacitor's first terminal connected to said voltage bias, and a switch having first and second terminals, said switch's first terminal connected in series with said variable gap capacitor's second terminal, said voltage bias providing a constant bias to the variable gap capacitor via said variable gap capacitor's first terminal, the variable gap capacitor having a movable plate and a fixed plate separated by a variable gap responsive to a charge modulation applied to the variable gap capacitor, and the switch for beginning an actuation cycle when closed and ending the actuation cycle when opened; and a charge integration circuit coupled to said switch's second terminal and configured to modulate charge on the variable gap capacitor during the actuation cycle, said charge integration circuit comprising:

a capacitor, an operational amplifier, and a comparator, said capacitor for collecting charge flowing from said variable gap capacitor to the charge integration circuit during the actuation cycle, the operational amplifier coupled to the capacitor and arranged to provide an output voltage corresponding to the charge collected by said capacitor, and the comparator arranged to compare a predetermined voltage with the output voltage from said operational amplifier and to produce an output signal that indicates when the output voltage from said operational amplifier equals the predetermined voltage, said comparator's output signal arranged to trigger said switch to open and end said actuation cycle;

wherein initiation of the actuation cycle triggers the flow of charge from the variable gap capacitor to the charge integration circuit.

2. The MEMS actuator of claim 1, wherein the charge integration circuit is coupled to the pixel via a single node.

3. The MEMS actuator of claim 1, further including a reset switch for resetting the capacitor of said charge integration circuit.

4. The MEMS actuator of claim 1, wherein the pixel further comprises a reset switch connected across the variable gap capacitor such that the reset switch resets the variable gap capacitor to initialize the charge on said variable gap capacitor to a predetermined level when closed.

5. The MEMS actuator of claim 1, wherein the switch is a transistor.

6. A MEMS actuator of claim 1, comprising a pixel array with a plurality of said pixels coupled to the charge integration circuit.

* * * * *